US007237909B2

(12) United States Patent
Yokote et al.

(10) Patent No.: US 7,237,909 B2
(45) Date of Patent: Jul. 3, 2007

(54) OPTICAL MEMBER, ILLUMINATING DEVICE, AND PROJECTION TYPE VIDEO DISPLAY

(75) Inventors: Yoshihiro Yokote, Osaka (JP); Takashi Ikeda, Osaka (JP); Hideyuki Kanayama, Kyoto (JP)

(73) Assignee: Sanyo Electronic Co., Ltd., Osaka (JP)

( * ) Notice: Subject to any disclaimer, the term of this patent is extended or adjusted under 35 U.S.C. 154(b) by 207 days.

(21) Appl. No.: 11/085,275

(22) Filed: Mar. 22, 2005

(65) Prior Publication Data
US 2005/0213055 A1 Sep. 29, 2005

(30) Foreign Application Priority Data
Mar. 29, 2004 (JP) ............................. 2004-095756
Feb. 25, 2005 (JP) ............................. 2005-051044

(51) Int. Cl.
  *G03B 21/28* (2006.01)
  *G02B 27/10* (2006.01)
(52) U.S. Cl. .................... 353/94; 353/30; 362/231; 362/234; 359/634
(58) Field of Classification Search ............ 353/30, 353/94, 81; 362/231, 241, 236, 234; 359/629, 359/634, 638, 639, 640, 834, 835
See application file for complete search history.

(56) References Cited

U.S. PATENT DOCUMENTS 5,453,918 A * 9/1995 Hernandex ............... 362/231
5,619,284 A * 4/1997 Magocs ..................... 348/757
6,139,166 A * 10/2000 Marshall et al. ........... 362/231
7,070,281 B2 * 7/2006 Kato ......................... 353/20
7,144,121 B2 * 12/2006 Minano et al. ............. 353/94

FOREIGN PATENT DOCUMENTS

| JP | 2002-189263 | 7/2002 |
| JP | 2002-296679 | 10/2002 |

* cited by examiner

*Primary Examiner*—William C. Dowling
(74) *Attorney, Agent, or Firm*—McDermott Will & Emery LLP

(57) ABSTRACT

A LED light source is formed of a plurality of LEDs (light-emitting diodes). Primary optical axes of respective LEDs are set to be perpendicular to the plane surface (LED arranging plane surface). A first LED light source emits a light in red, a second LED light source emits a light in green, and a third LED light source emits a light in blue. An optical member has a first dichroic mirror portion and a second dichroic mirror portion alternately arranged, and the mirror potions inclined and arranged so as to form a saw-tooth appearance. Both the first dichroic mirror portion and the second dichroic mirror portion are designed to transmit the light in blue, and reflect lights in other colors.

24 Claims, 7 Drawing Sheets

OPTICAL MEMBER, ILLUMINATING DEVICE, AND PROJECTION TYPE VIDEO DISPLAY

BACKGROUND OF THE INVENTION

Field of the Invention

The present invention relates to an optical member, an illuminating device, and a projection type video display. Conventionally, as an apparatus for displaying a large-screen image, it is known a liquid crystal projector that irradiates on a liquid crystal panel a light from an illuminating device, and enlarges and projects on a screen an image displayed on the liquid crystal panel, and there is an apparatus that uses a multiple-light type illuminating device that uses a plurality of light sources as the illuminating device (see JP-A-2002-296679). As shown in FIG. 10, a multiple-light type illuminating device 50 is an apparatus structured of combining a light flux emitted from a first light source 51 and a second light source 52 by a reflection mixing member 53. The reflection mixing member 53 is provided with a first reflection surface 53a, and a second reflection surface 53b one after another. The reflection mixing member 53 is also referred to as a prism array.

In addition, it is proposed a configuration in which each of a light in red from a LED (light-emitting diode) in red, a light in green from a LED in green, and a light in blue from a LED in blue is guided into one direction by using a cross dichroic prism (see JP-A-2002-189263).

SUMMARY OF THE INVENTION

There is the cross dichroic prism described in the above reference as an optical member capable of generating lights in three primary colors by a light-emitting diode high in color purity, and others, and guiding the lights in the respective colors into one direction. However, this cross dichroic prism is expensive. On the other hand, in the above-described configuration using the prism array, it is not possible to guide the lights in three colors into the one direction.

In view of the above-described circumstance, it is an object of the present invention to provide an optical member capable of guiding lights in three colors into one direction not using a cross dichroic prism, an illuminating device using this optical member, and a projection type video display using this illuminating device.

In order to solve the above-described problem, an optical member of the present invention has one or a plurality of pairs formed of a first reflecting element that reflects into a specific direction a light in a first color received from a first direction and a second reflecting element that reflects into a direction parallel to the specific direction a light in a second color received from a second direction, at least one of the first reflecting element and the second reflecting element is a dichroic mirror that transmits a light in a third color and reflects the light in the first color and the light in the second color, and the dichroic mirror is arranged in such a manner as to transmit the light in the third color incident from a third direction and to guide into the direction parallel to the specific direction. (Hereinafter, referred to as a first optical member in this section).

Such the configuration enables to guide lights in three colors into one direction without using a cross dichroic prism.

An illuminating device of the present invention comprises the first optical member, a first light source for emitting a light in a first color, a second light source for emitting a light in a second color, and a third light source for emitting a light in a third color (Hereinafter, referred to as a first illuminating device in this section).

In the above-described first illuminating device, all or at least one of the light sources may be formed of a solid light-emitting element array in which a plurality of solid light-emitting elements are arranged in the same plane surface. In the above-described first illuminating device, and the illuminating device according thereto, it may be possible that the third light source is formed of a solid light-emitting element array in which a plurality of solid light-emitting elements are arranged in the same plane surface, and primary optical axes of respective solid light-emitting elements are perpendicular to the plane surface. In addition, in the above-described first illuminating device, all or at least one of the light sources may be formed of one solid light-emitting element.

Furthermore, an optical member of the present invention has one or a plurality of pairs formed of a first reflecting element that reflects into a specific direction a light in a first color received from a first direction and a second reflecting element that reflects into a direction parallel to the specific direction a light in a second color received from a second direction, at least one of the first reflecting element and the second reflecting element is a dichroic prism that transmits a light in a third color and reflects the light in the first color and the light in the second color, and the dichroic prism is arranged in such a manner as to transmit the light in the third color incident from a light-incidence surface side of the dichroic prism so as to guide into the direction parallel to the specific direction (Hereinafter, referred to as a second optical member in this section).

In addition, an illuminating device of the present invention comprises the above-described second optical member, a first light source for emitting a light in a first color, a second light source for emitting a light in a second color, and a third light source for emitting a light in a third color (Hereinafter, referred to as a second illuminating device in this section).

In the above-described second illuminating device, all or at least one of the light sources may be formed of a solid light-emitting element array in which a plurality of solid light-emitting elements are arranged in the same plane surface. In addition, in the above-described second illuminating device, and the configuration according thereto, it may be possible that the third light source is formed of a solid light-emitting element array in which a plurality of solid light-emitting elements are arranged in the same plane surface, and primary optical axes of respective solid light-emitting elements are not perpendicular to the plane surface. Or, it may be possible that the third light source is formed of a solid light-emitting element array in which a plurality of solid light-emitting elements are arranged in the same plane surface, the primary optical axes of respective solid light-emitting elements are perpendicular to the plane surface, and on emission-sides of each solid light-emitting element of the third light source, an angle control lens is provided.

In the above-described second illuminating device, all or at least one of the light sources may be formed of one solid light-emitting element. In such the configuration or the above-described second illuminating device, it may be possible that the third light source is formed of one solid light-emitting element, and on an emission-side of the one solid light-emitting element, an angle control lens is provided.

In addition, an optical member of the present invention has a plurality of pairs formed of a first reflecting element that reflects into a specific direction a light in a first color received from a first direction and a second reflecting element that reflects into a direction parallel to the specific direction a light in a second color received from a second direction, at least one of the first reflecting element and the second reflecting element is a dichroic prism that transmits a light in a third color and reflects the light in the first color and the light in the second color, and the dichroic prism has on a light-incidence side in a separate body or in a body a transparent member that controls an advancing direction of the light and is arranged in such a manner as to transmit the light in the third color incident through the transparent member so as to guide into the direction parallel to the specific direction (Hereinafter, referred to as a third optical member in this section).

An illuminating device of the present invention comprises the third optical member, a first light source for emitting a light in a first color, a second light source for emitting a light in a second color, and a third light source for emitting a light in a third color (Hereinafter, referred to as a third illuminating device in this section).

In the above-described third illuminating device, all or at least one of the light sources may be formed of a solid light-emitting element array in which a plurality of solid light-emitting elements are arranged in the same plane surface. In such the configuration or the above-described third illuminating device, it may be possible that the third light source is formed of a solid light-emitting element array in which a plurality of solid light-emitting elements are arranged in the same plane surface, and primary optical axes of respective solid light-emitting elements are perpendicular to the plane surface.

In the above-described third illuminating device, all or at least one of the light sources may be formed of one solid light-emitting element.

In any one of the illuminating devices described above, it may be possible that the first light source and the second light source are formed of a solid light-emitting element array in which a plurality of solid light-emitting elements are arranged in the same plane surface, and primary optical axes of respective solid light-emitting elements are perpendicular to the plane surface. Or, in any one of the above-described illuminating devices, it may be possible that the first light source and the second light source are formed of a solid light-emitting element array in which a plurality of solid light-emitting elements are arranged in the same plane surface, and primary optical axes of respective solid light-emitting elements are not perpendicular to the plane surface.

In any one of the above-described illuminating devices, it may be possible to be structured of always emitting the light in red, the light in green, and the light in blue when the illuminating device is turned on (Hereinafter, referred to as a fourth illuminating device). Or, in any one of the above-described illuminating devices, it may be possible to be structured of sequentially emitting the light in red, the light in green, and the light in blue for a predetermined time period when the illuminating device is turned on (Hereinafter, referred to as a fifth illuminating device).

Furthermore, a projection type video display of the present invention comprises the fourth illuminating device, one full color light valve for receiving a light from the fourth illuminating device, and a projecting means for projecting an image light obtained by being passed through the full color light valve. In addition, a projection type video display of the present invention comprises the fourth illuminating device, a means for separating a light from the fourth illuminating device into three primary colors, three light valves for receiving lights in respective colors, and a means for combining and projecting image lights in respective colors obtained as a result of passing through each of the light valves.

In addition, a projection type video display of the present invention comprises the fifth illuminating device, one light valve for receiving a light from the fifth illuminating device, a means for supplying video signals for respective colors to the light valve in synchronous with an emitting timing of lights in the respective colors, and a projecting means for projecting an image light obtained by being passed through the light valve.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an optical member, an illuminating device, and a projection type video display of an embodiment of the present invention will be described based on FIG. 1 to FIG. 9.

Figure 1:
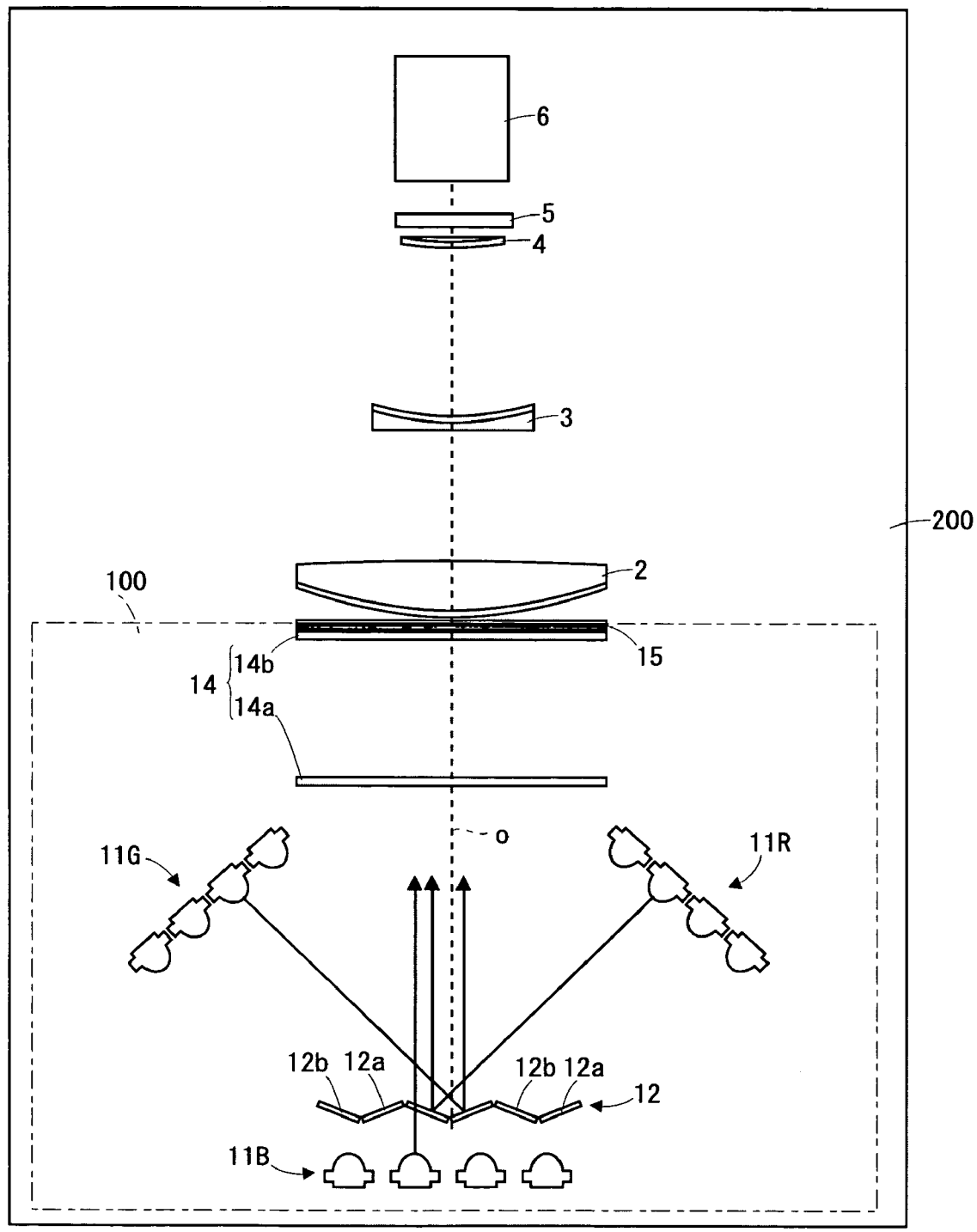
FIG. 1 is a descriptive diagram showing a projection type video display provided with an illuminating device of an embodiment of the present invention.

FIG. 1 is a schematic structural view showing an optical member 12, an illuminating device 100, and a projection type video display 200 of an embodiment of the present invention. The illuminating device 100 is formed of being provided with LED light sources 11G, 11R, and 11B (a numeral "11" will be used when showing not specifying each LED light source), the optical member 12, integrator lens (one pair of fly's eye lenses) 14, and a polarization conversion system 15. Furthermore, the projection type video display 200 is formed of being provided with the above-described illuminating device 100, condenser lenses 2, 3, and 4, a liquid crystal display panel 5, and a projection lens 6.

The LED light source 11 is a light source in which a plurality of LEDs (light-emitting diodes) are arranged in an array shape in the same plane surface. Primary optical axes of respective LED light sources are set in such a manner as to be perpendicular to the plane surface (LED arranging plane surface). The LED light source 11R emits a light in red, the LED light source 11G emits a light in green, and the LED light source 11B emits a light in blue. Each LED of the LED light sources 11 may be provided with a lens portion for rendering the light parallel. In addition, it may be possible to adopt a LED light source formed in such a manner that a LED chip is arranged in the array shape, and a lens cell (for rendering a light parallel) is arranged on a light-emission side of each LED chip by a mold, and others.

The optical member 12 is formed of one or a plurality of pairs formed of a first dichroic mirror portion 12a and a second dichroic mirror portion 12b. The mirror portions 12a, 12b are inclined and arranged in such a manner as to form a saw-tooth appearance. The first dichroic mirror portion 12a and the second dichroic mirror portion 12b are members in a thin plate shape long in a vertical direction toward a surface of FIG. 1. Both the first dichroic mirror portion 12a and the second dichroic mirror potion 12b are designed to transmit the light in blue, and reflects the lights in other colors.

In FIG. 1, the optical axes of a reflected light and a transmitted light, and a normal line O of the optical member 12 are shown in common. The primary optical axis of the LED light source 11G and the normal line O form a predetermined angle, and similarly, the primary optical axis of the LED light source 11R and the normal line O form the same angle as the predetermined angle. In addition, in such a manner that the light in green emitted from the LED light source 11G is reflected by the first dichroic mirror portion 12a in a direction parallel to the normal line O, and the light in red emitted from the LED light source 11R is reflected by the second dichroic mirror portion 12b into the direction parallel to the normal line O, the angle (apex angle) that the first dichroic mirror portion 12a and the second dichroic mirror portion 12b form, and a location (direction of the primary optical axes) of the LED light source 11G and the LED light source 11R are adjusted.

The LED light source 11B is arranged in such a manner that the primary optical axis thereof is rendered parallel to the normal line O. The light in blue emitted from the LED light source 1B transmits the first dichroic mirror portion 12a and the second dichroic mirror portion 12, and advances parallel to the light in red and the light in green reflected by the first dichroic mirror portion 12a and the dichroic mirror portion 12b.

The integrator lens 14 is arranged parallel (vertically toward the normal line O) to the optical member 12. The integrator lens 14 is formed of one pair of fly's eye lenses 14a, 14b, and has each convex lens pair designed in such a manner as to irradiate the lights from the LED light sources 11G, 11R, and 11B onto an entire surface of the liquid crystal display panel 5. That is, the integrator lens is a lens for allowing a luminance non-uniformity of the lights in the respective colors on an incidence-side fly's eye lens 14a not to be reflected on the liquid crystal display panel 5, and a light intensity distribution of the lights in the respective colors are rendered approximately uniform on the liquid crystal display panel 5.

The polarization conversion system 15 is structured of a polarization beam splitter array (Hereinafter, referred to as a PBS array). The PBS array is provided with a polarized light separating surface and a retardation plate (½λ plate). Each polarized light separating surface of the PBS array transmits a P-polarized light, for example, out of lights from the integrator lens 14 and changes an optical path of an S-polarized light by 90 degrees. The S-polarized light having the optical path changed is reflected by an adjacent polarized light separating surface, converted into the P-polarized light by the retardation plate provided on a front side (light-emission side) of the retardation plate, and emitted therefrom. On the other hand, the P-polarized light that passes through the polarized light separating surface is emitted as it is. That is, in this case, approximately all lights are converted into the P-polarized light. In the above-described example, descriptions were made regarding the configuration in which all lights are converted into the P-polarized light, and by providing the retardation plate in a P-polarized light-emission location, it is possible, too, to be structured of converting all the lights into the S-polarized light.

The light emitted from the above-described illuminating device 100 reaches the liquid crystal display panel 5 via the condenser lenses 2, 3, and 4. The light incident on this liquid crystal display panel 5 is subjected to a light intensity modulation according to a light transmissivity set in each pixel so as to become an image light, and projected by the projection lens onto a screen not shown.

The above-described liquid crystal display panel 5 has structure of being provided with an RGB color filter, or not being provided with the RGB color filter. In a case of using the display panel 5 structured of being provided with the RGB color filter, the LED light source 11 is always turned on, and a light in white is guided onto the display panel 5. In a case of using the display panel structured of not being provided with the RGB color filter, the LED light sources 11R, 11G, and 11B are sequentially turned on in a time-sharing manner for a predetermined time period, and the video signals in the respective colors are supplied to the display panel 5 in synchronous with a timing of turning on the light sources for the predetermined time period.

One of the first dichroic mirror portion 12a and the second dichroic mirror portion 12b may be a mirror that does not transmit the light in blue (ordinary mirror). In a case that one of the two mirrors is the ordinary mirror, the first dichroic mirror portion 12a may be the ordinary mirror (the second dichroic mirror portion 12b is retained). The dichroic mirror, using a wavelength value arbitrarily set as a boundary, reflects a light of a wavelength on an upper side, and transmits a light of a wavelength on a lower side, for example. If the light in color to be transmitted, and the light in color to be reflected are mixed in the vicinity of the boundary, a utilization efficiency of light is decreased. The second dichroic mirror portion 12b reflects the light in red and transmits the light in blue. Because the light in red and the light in blue are distant in a wavelength band, as described above, the second dichroic mirror portion 12b may be retained.

Figure 2:
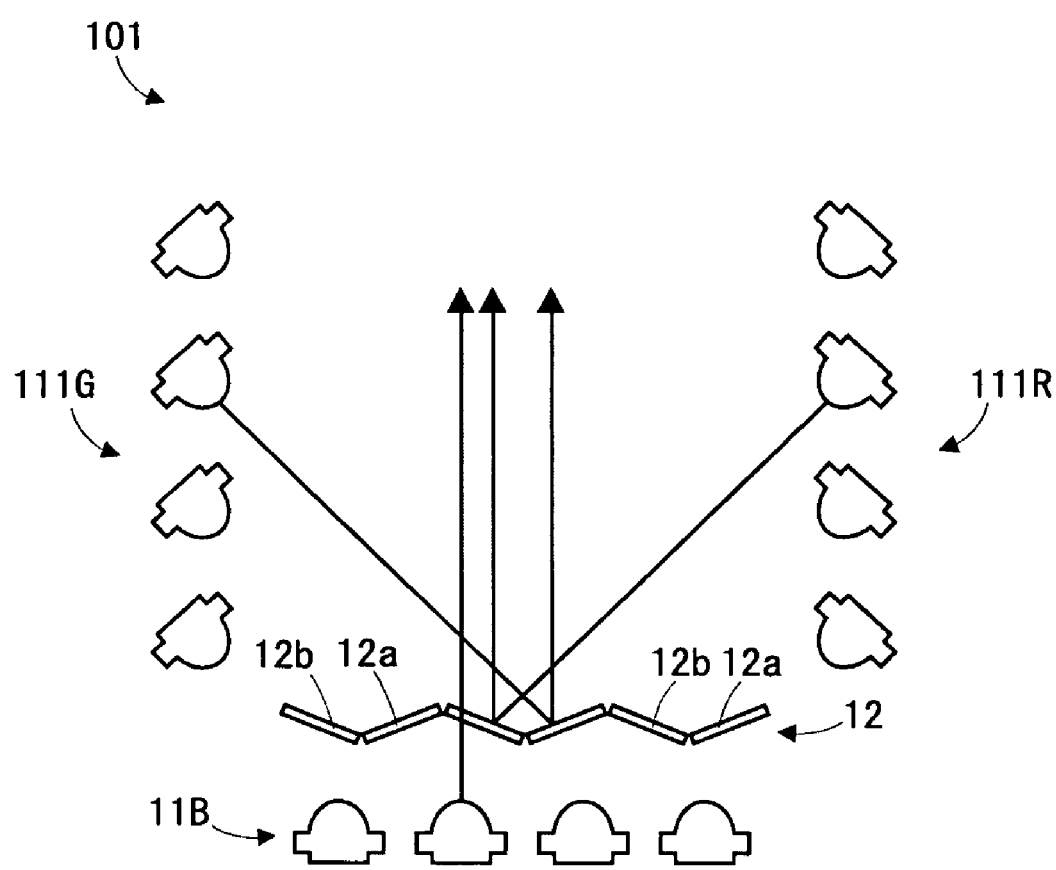
FIG. 2 is a descriptive diagram showing an illuminating device of an embodiment of the present invention.

FIG. 2 is a descriptive diagram showing an illuminating device 101. A difference with the illuminating device 100 is that the illuminating device 101 is provided with LED light sources 111R, 111G (Hereinafter, a numeral "111" is used when showing not specifying each LED light source) instead of the LED light sources 11R, 11G. The LED light source 111 is a light source in which a plurality of LEDs are arranged in the same plane surface, and primary optical axes of respective LEDs are set not to be perpendicular to the plane surface (LED arranging surface). Needless to say, the light in red and the light in green reflected by the optical member 12 are parallel with each other, and are also parallel to the light in blue that is emitted from the LED light source 11B, and transmits the optical member 12. Compared to the illuminating device 100, the illuminating device 101 is more advantageous than the illuminating device 100 because of its reduction in size. On the other hand, regarding a radiating characteristic, the illuminating device 100 has a distance between the LED light sources so that the illuminating device 100 is more advantageous than the illuminating device 101.

Figure 3:
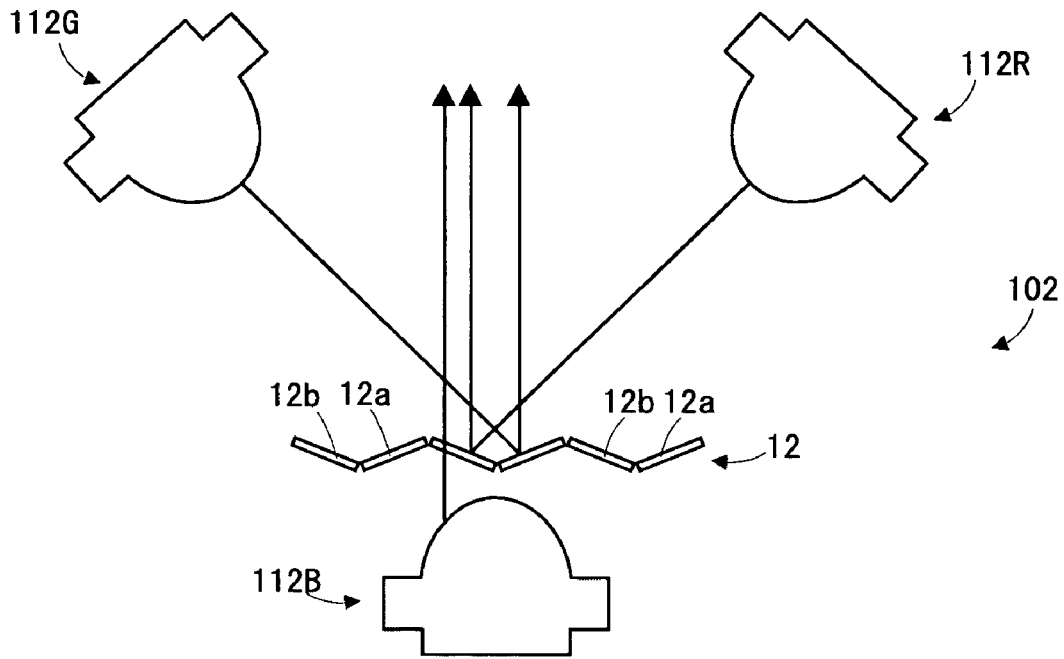
FIG. 3 is a descriptive diagram showing an illuminating device of an embodiment of the present invention.

FIG. 3 is a descriptive diagram showing an illuminating device 102. The illuminating device 102 is formed of being provided with LED light sources 112G; 112R, and 112B (Hereinafter, a numeral "112" is used when showing not specifying each LED light source), and the optical member 12. Each LED light source 112 is formed of one LED. In such a manner that the light in red reflected by the optical member 12, the light in green reflected by the optical member 12, and the light in blue that is emitted from the LED light source 112B and transmits the optical member 12 are rendered parallel with each other, the primary optical axes of the LED light sources 112G; 112R, and 112B are adjusted.

Figure 4:
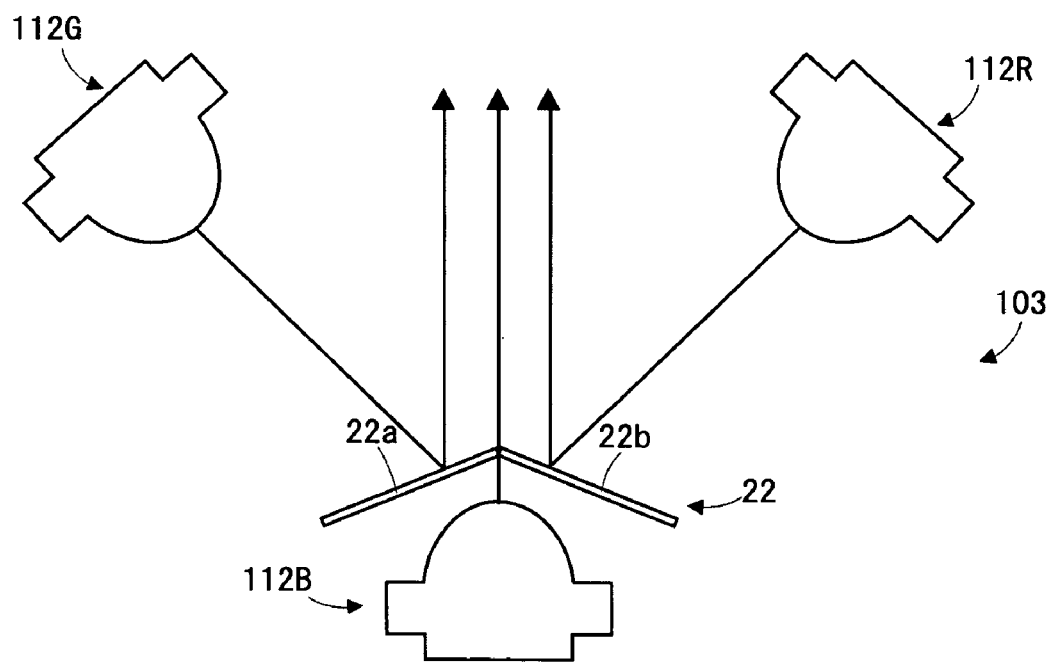
FIG. 4 is a descriptive diagram showing an illuminating device of an embodiment of the present invention.

FIG. 4 is a descriptive diagram showing an illuminating device 103. The illuminating device 103 is formed of being provided with the LED light sources 112G, 112R, and 112B (Hereinafter, a numeral "112" is used when showing not specifying each LED light source), and an optical member 22. The optical member 22 is formed of being provided with one first dichroic mirror portion 22a, and one second dichroic mirror portion 22b. The mirror portions 22a, and 22b are inclined and arranged in such a manner as to form an angle shape. Both the first dichroic mirror portion 22a and the second dichroic mirror portion 22b are designed to transmit the light in blue, and reflect the lights in other colors. In such a manner that the light in red reflected by the optical member 22, the light in green reflected by the optical member 22, and the light in blue that is emitted from the LED light source 112B and transmits the optical member 22 are rendered parallel with each other, the primary optical axes of the LED light sources 112G, 112R, and 112B, and angles of inclination of the mirror portions 22a, 22b are adjusted. It is noted that sets formed of the optical member 22, and the LED light source 1112B may be provided in plural.

Figure 5:
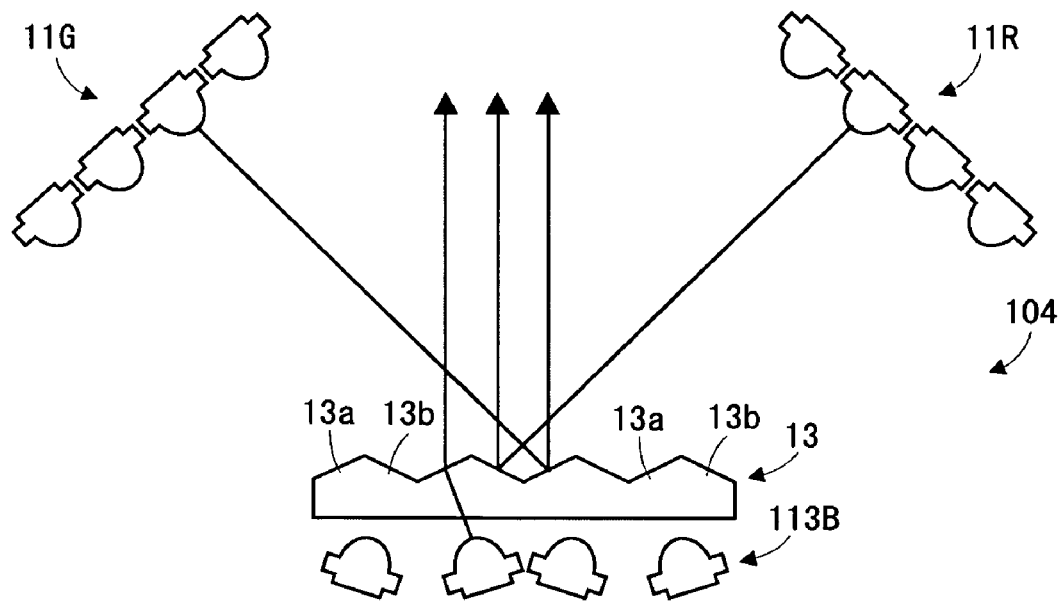
FIG. 5 is a descriptive diagram showing an illuminating device of an embodiment of the present invention.

FIG. 5 is a descriptive diagram showing an illuminating device 104. A difference with the illuminating device 100 is that the illuminating device 104 is provided with an optical member 13 instead of the optical member 12, and a LED light source 113B instead of the LED light source 11B. The optical member 13 is formed of being provided with a plurality of pairs formed of a first dichroic prism portion 13a, and a second dichroic prism portion 13b. The prism portions 13a, 13b are formed in such a manner as to form a saw-tooth appearance on a light-emission surface (reflecting surface) side. Both the first dichroic prism portion 13a and the second dichroic prism portion 13b are designed to transmit the light in blue, and reflect the lights in other colors.

The LED light source 113B is a light source in which a plurality of LEDs are arranged in the same plane surface, and each LED, according to its location, is arranged in such a manner that the primary optical axes are set not to be perpendicular to the plane surface (LED arranging surface). That is, each LED arranged in such a manner as to emit the light toward the prism portion 13a is inclined at a predetermined angle in a counterclockwise direction toward the normal line O, and as a result, the light that transmits the prism portion 13a and emits therefrom is rendered parallel to the normal line O. In addition, each LED arranged in such a manner as to emit the light toward the prism portion 13b is inclined at a predetermined angle in a clockwise direction toward the normal line O, and as a result, the light that transmits the prism portion 13b and emits therefrom is rendered parallel to the normal line O.

One of the first dichroic prism portion 13a and the second dichroic prism portion 13b may be an ordinary mirror that does not transmit the light in blue. In a case that one of the two mirrors is the ordinary mirror, the first dichroic prism portion 13a may be the ordinary mirror (the second dichroic prism portion 12b is retained). The dichroic prism, using a wavelength value arbitrarily set as a boundary, reflects a light of a wavelength on an upper side, and transmits a light of a wavelength on a lower side, for example. If the light in color to be transmitted, and the light in color to be reflected are mixed in the vicinity of the boundary, a utilization efficiency of light is decreased. The second dichroic prism portion 13b reflects the light in red and transmits the light in blue. The light in red and the light in blue are distant in a wavelength band so that as described above, the second dichroic prism portion 13b may be retained.

Figure 6:
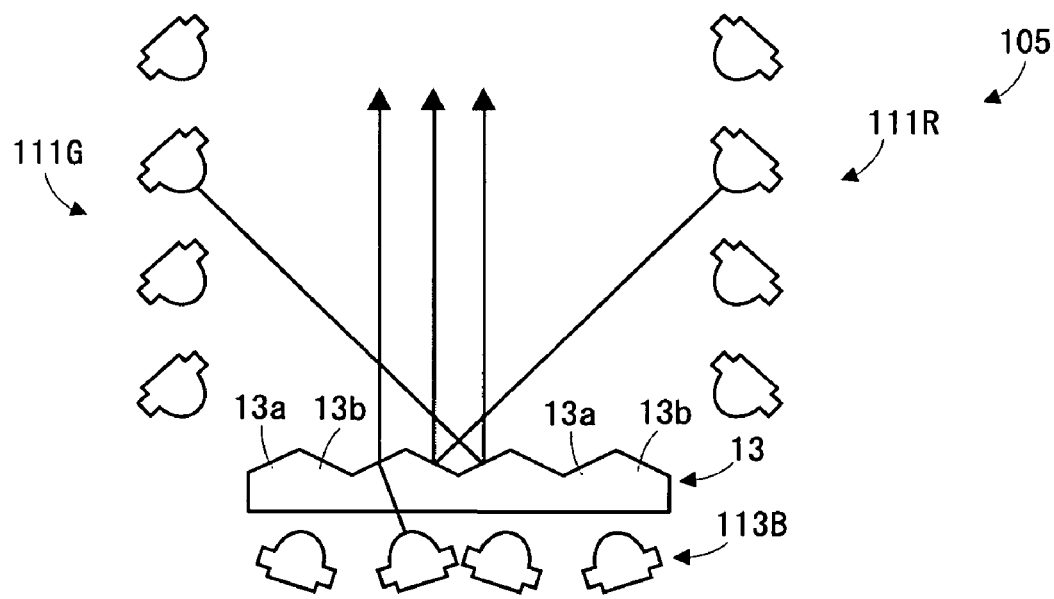
FIG. 6 is a descriptive diagram showing an illuminating device of an embodiment of the present invention.

FIG. 6 is a descriptive diagram showing an illuminating device 105. A difference with the illuminating device 104 is that the illuminating device 105 is provided with the LED light sources 111R, 111G instead of the LED light sources 11R, 11G. The illuminating device 105 is more advantageous than the illuminating device 104 because of its reduction in size. On the other hand, regarding a radiating characteristic, the illuminating device 104 has a distance between the LED light sources so that the illuminating device 104 is more advantageous than the illuminating device 105.

Figure 7:
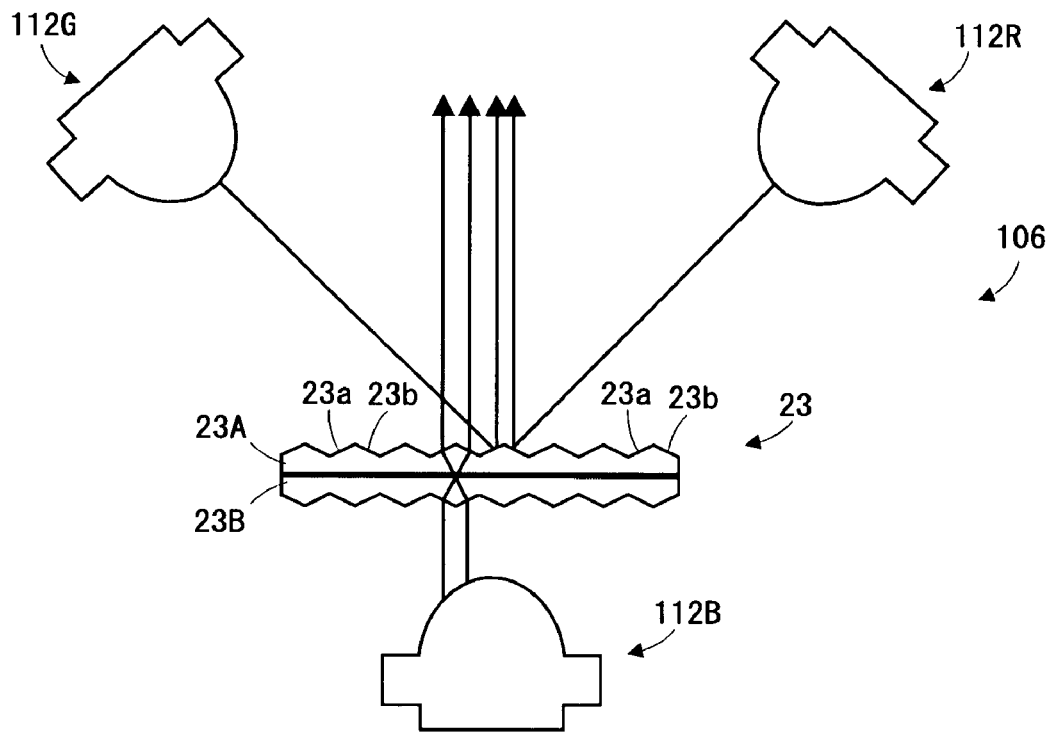
FIG. 7 is a descriptive diagram showing an illuminating device of an embodiment of the present invention.

FIG. 7 is a descriptive diagram showing an illuminating device 106. The illuminating device 106 is formed of being provided with the LED light sources 112G, 112R, and 112B, and an optical member 23. Each LED light source 112 is formed of one LED. The optical member 23 is formed of a first member 23A and a second member 23B (members controlling an advancing direction of the light).

The first member 23A has the same configuration as the optical member 13. That is, the first member 23A is formed of being provided with a plurality of pairs formed of a first dichroic prism portion 23a and a second dichroic prism portion 23b. The prism portions 23a, 23b are formed in such a manner as to form a saw-tooth appearance on the light-emission surface (reflection surface) side. Both the first dichroic prism portion 23a and the second dichroic prism portion 23b are designed to transmit the light in blue, and reflect the lights in other colors. It is noted that the illuminating device 106 is different from the illuminating device 104 in that a plurality of prism portions 23a, 23b exist within a light flux of the LED light source 112B.

The second member 23B is a prism array (not having a dichroic characteristic) in this embodiment. A line connecting an apex portion of an angle-shaped portion of this prism array, and an apex portion of an angle-shaped portion formed of the prism portions 23a, 23b are parallel to the normal line O (omitted in FIG. 7) of the optical member 23. In this illuminating device 106, in such a manner that the primary optical axis of the light in red reflected by the optical member 23, the primary optical axis of the light in green reflected by the optical member 23, and the primary optical axis of the light in blue that is emitted from the LED light source 112B and transmits the optical member 23 are rendered parallel with each other, the primary optical axes of the LED light sources 112G, 112R, and 112B, and the angle of the angle-shaped portions are adjusted.

Figure 8:
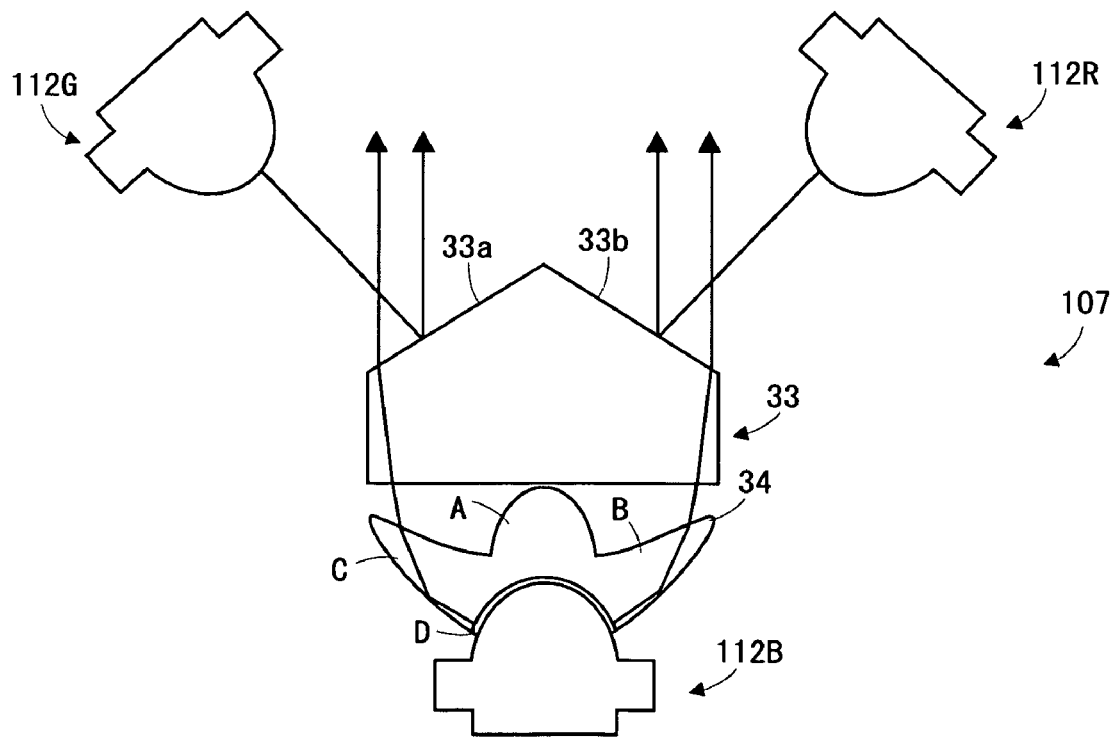
FIG. 8 is a descriptive diagram showing an illuminating device of an embodiment of the present invention.

An illuminating device 107 shown in FIG. 8 is formed of being provided with the LED light sources 112G, 112R, and 112B, an optical member 33, and an angle control lens 34. Each LED light source 112 is formed of one LED. The optical member 33 is formed of having one pair formed of a first dichroic prism portion 33a and a second dichroic prism portion 33b. To the one LED light source 112B, one pair of the prism portions 33a, 33b corresponds. Both the first dichroic prism portion 33a and the second dichroic prism portion 33b are designed to transmit the light in blue, and reflect the lights in other colors. The angle control lens 34 is provided between the optical member 33 and the LED light source 112B, and in such a manner that the light in blue emitted from the optical member 33 is rendered an approximate parallel light, controls a dispersed angle of the light in blue emitted from the LED light source 112B, and guides the controlled light in blue into a light-incidence surface of the optical member 33. The angle control lens 34 is formed of a transparent member having a shape of a rotational symmetry, and is formed of a convex-shaped non-spherical portion A in a center portion, a peripheral-side non-spherical portion B, a peripheral-side non-spherical mirror portion C, and a concave-shaped non-spherical portion D in the center. From the LED light source 112G, a dispersed light (non-parallel light) is emitted. It is noted that as the angle control lens 34, it may be possible to provide an ordinary lens for rendering the light parallel, and others.

Figure 9:
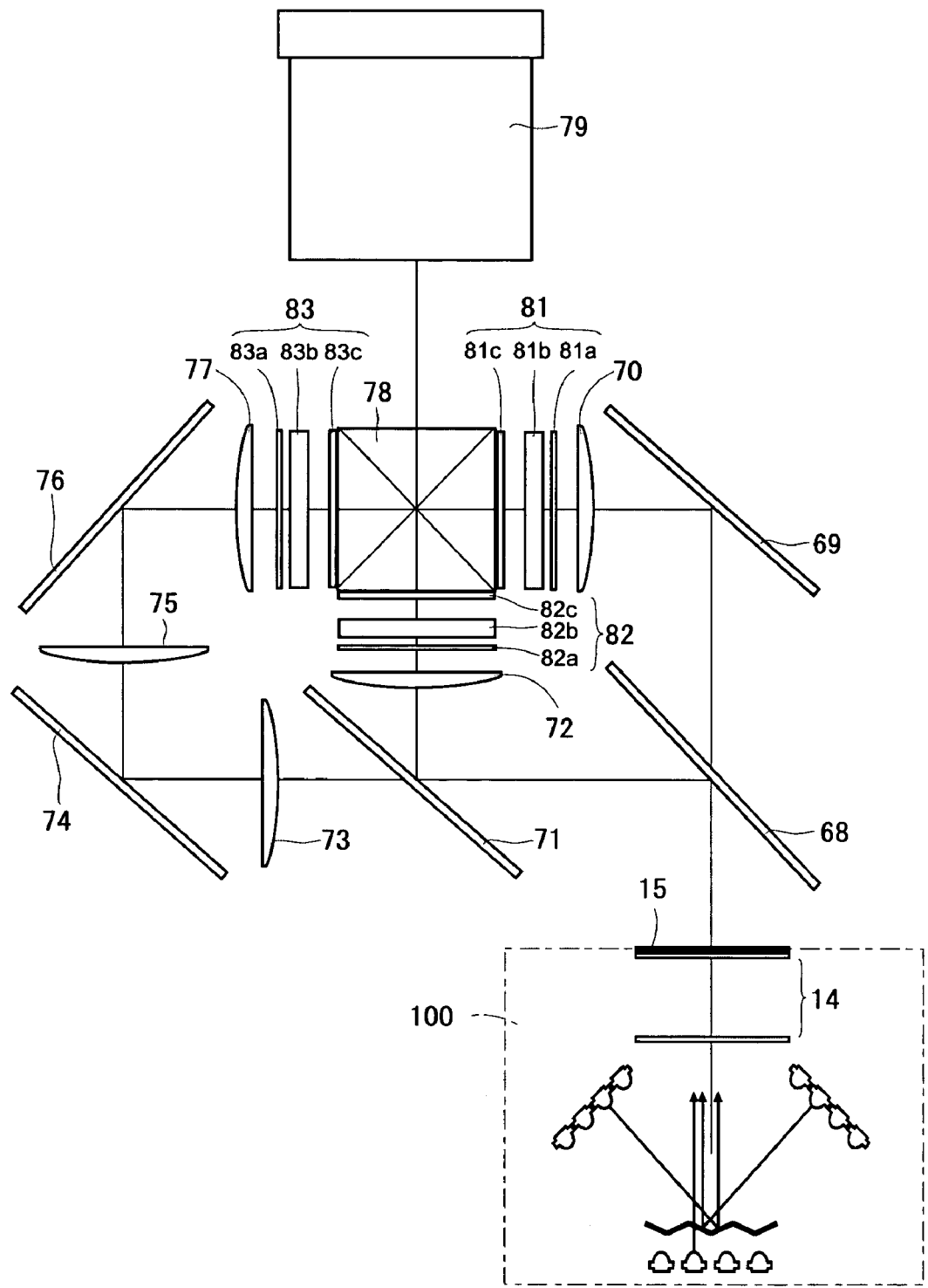
FIG. 9 is a descriptive diagram showing a projection type video display provided with an illuminating device of another embodiment of the present invention.
Figure 10:
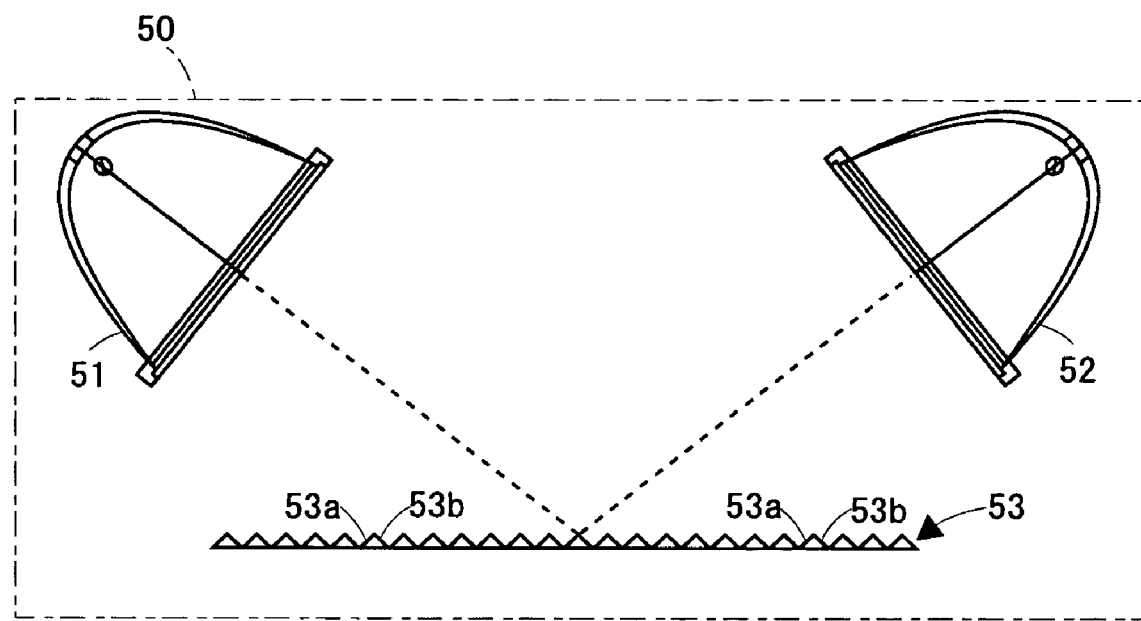
FIG. 10 is a descriptive diagram showing a conventional illuminating device.

FIG. 9 is a descriptive diagram showing a three-panel projection type video display provided with the illuminating device 100 regarding the present invention. Lights in respective colors are always emitted from the illuminating device 100. A light in white emitted from the illuminating device 100 is guided to a first dichroic mirror 68. The first dichroic mirror 68 transmits a light in a red wavelength band, and reflects a light in a cyan (green+blue) wavelength band. The light in a red wavelength band that passes through the first dichroic mirror 68 is reflected by a reflection mirror 69, and thereby, an optical path is changed. The light in red reflected by the reflection mirror 69, via a condenser lens 70, is guided into a transmission type liquid crystal display panel 81 for red light, and is optically modulated as a result of passing through this display panel 81. On the other hand, the light in a cyan wavelength band reflected by the first dichroic mirror 68 is guided to a second dichroic mirror 71.

The second dichroic mirror 71 transmits a light in a blue wavelength band, and reflects a light in a green wavelength band. The light in a green wavelength band reflected by the second dichroic mirror 71, via a condenser lens 72, is guided into a transmission type liquid crystal display panel 82 for green light, and is optically modulated as a result of passing through this display panel 82. In addition, the light in a blue wavelength band that passes through the second dichroic mirror 71, via reflection mirrors 74, 76, relay lenses 73, 75, and a condenser lens 77, is guided into a transmission type liquid crystal display panel 83 for blue light, and is optically modulated as a result of passing through the display panel 83.

Each liquid crystal display panel 81, 82, and 83 is formed of being provided with incidence-side polarizing plates 81a, 82a, and 83a, panel portions 81b, 82b, and 83b formed by sealing a liquid crystal between a pair of glass boards (in which a pixel electrode and an alignment film are formed), and emission-side polarizing plates 81c, 82c, and 83c. Modulated lights (image lights in respective colors) modulated by passing through the liquid crystal display panels 81, 82, and 83 are combined by a cross dichroic prism 78, and rendered a color image light. The color image light is enlarged and projected by a projection lens 79, and is displayed on a screen.

In the above-described embodiments, although the transmission type liquid crystal display panel 5 is used, this is not always the case. A reflection type liquid crystal display panel may be used. Or, a light modulating element, a type in which each one of micro mirrors is driven singly, for example, may be used instead of the liquid crystal display panel. In addition, the liquid crystal display panel is not limited to a light-emitting diode (LED), and an organic or inorganic electroluminescence, and others may be used.

The present invention exhibits an advantage that it is capable of guiding the three lights in color into one direction not using the cross dichroic prism.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical member, having one or a plurality of pairs formed of a first reflecting element that reflects into a specific direction a light in a first color received from a first direction and a second reflecting element that reflects into a direction parallel to said specific direction a light in a second color received from a second direction, at least one of said first reflecting element and said second reflecting element being a dichroic mirror that transmits a light in a third color and reflects the light in the first color and the light in the second color, and said dichroic mirror being arranged in such a manner as to transmit the light in the third color incident from a third direction so as to guide into the direction parallel to said specific direction.

2. An illuminating device, comprising the optical member according to claim 1, a first light source for emitting a light in a first color, a second light source for emitting a light in a second color, and a third light source for emitting a light in a third color.

3. An illuminating device according to claim 2, wherein all or at least one of said light sources is formed of a solid light-emitting element array in which a plurality of solid light-emitting elements are arranged in the same plane surface.

4. An illuminating device according to claim 2, wherein said third light source is formed of a solid light-emitting element array in which a plurality of solid light-emitting elements are arranged in the same plane surface, and primary optical axes of respective solid light-emitting elements are perpendicular to said plane surface.

5. An illuminating device according to claim 2, wherein all or at least one of said light sources is formed of one solid light-emitting element.

6. An optical member, having a plurality of pairs formed of a first reflecting element that reflects into a specific direction a light in a first color received from a first direction and a second reflecting element that reflects into a direction parallel to said specific direction a light in a second color received from a second direction, at least one of said first reflecting element and said second reflecting element being a dichroic prism that transmits a light in a third color and reflects the light in the first color and the light in the second color, and said dichroic prism being arranged in such a manner as to transmit the light in the third color incident from a light-incidence surface thereof so as to guide into the direction parallel to said specific direction, wherein said specific direction is not perpendicular to said first direction and said second direction.

7. An illuminating device, comprising the optical member according to claim 6, a first light source for emitting a light in a first color, a second light source for emitting a light in a second color, and a third light source for emitting a light in a third color.

8. An illuminating device according to claim 7, wherein all or at least one of said light sources is formed of a solid light-emitting element array in which a plurality of solid light-emitting elements are arranged in the same plane surface.

9. An illuminating device according to claim 7, wherein said third light source is formed of a solid light-emitting element array in which a plurality of solid light-emitting elements are arranged in the same plane surface, and primary optical axes of respective solid light-emitting elements are not perpendicular to said plane surface.

10. An illuminating device according to claim 7, wherein said third light source is formed of a solid light-emitting element array in which a plurality of solid light-emitting elements are arranged in the same plane surface, primary optical axes of each solid light-emitting element are perpendicular to said plane surface, and on emission-sides of each solid light-emitting element of the third light source, an angle control lens is provided.

11. An illuminating device according to claim 7, wherein all or at least one of said light sources is formed of one solid light-emitting element.

12. An illuminating device according to claim 7, wherein said third light source is formed of one solid light-emitting element, and on an emission side of said one solid light-emitting element of the third light source, an angle control lens is provided.

13. An optical member, having a plurality of pairs formed of a first reflecting element that reflects into a specific direction a light in a first color received from a first direction and a second reflecting element that reflects into a direction parallel to said specific direction a light in a second color received from a second direction, at least one of said first reflecting element and said second reflecting element being a dichroic prism that transmits a light in a third color and reflects the light in the first color and the light in the second color, and said dichroic prism having on a light-incidence side in a separate body or in a body a transparent member that controls an advancing direction of the light, and being arranged in such a manner as to transmit the light in the third color incident through said transparent member so as to guide into the direction parallel to said specific direction.

14. An illuminating device, comprising the optical member according to claim 13, a first light source for emitting a light in a first color, a second light source for emitting a light in a second color, and a third light source for emitting a light in a third color.

15. An illuminating device according to claim 14, wherein all or at least one of said light sources is formed of a solid light-emitting element array in which a plurality of solid light-emitting elements are arranged in the same plane surface.

16. An illuminating device according to claim 14, wherein said third light source is formed of a solid light-emitting element array in which a plurality of solid light-emitting elements are arranged in the same plane surface, and primary optical axes of respective solid light-emitting elements are perpendicular to said plane surface.

17. An illuminating device according to claim 14, wherein all or at least one of said light sources is formed of one solid light-emitting element.

18. An illuminating device according to any one of claims 2 or 7 or 14, wherein the first light source and the second light source are formed of a solid light-emitting element array in which a plurality of solid light-emitting elements are arranged in the same plane surface, and primary optical axes of respective solid light-emitting elements are perpendicular to said plane surface.

19. An illuminating device according to any one of claim 2 or 7 or 14, wherein the first light source and the second light source are formed of a solid light-emitting element array in which a plurality of solid light-emitting elements are arranged in the same plane surface, and primary optical axes of respective solid light-emitting elements are not perpendicular to said plane surface.

20. An illuminating device according to any one of claim 2 or 7 or 14, structured of always emitting a light in red, a light in green, and a light in blue when the illuminating device is turned on.

21. An illuminating device according to any one of claim 2 or 7 or 14, structured of sequentially emitting a light in red, a light in green, and a light in blue for a predetermined time period when the illuminating device is turned on.

22. A projection type video display, comprising the illuminating device according to claim 20, one full color light valve for receiving a light from said illuminating device, and a projecting means for projecting an image light obtained by being passed through said full color light valve.

23. A projection type video display, comprising the illuminating device according to claim 20, a means for separating a light from said illuminating device into three primary colors, three light valves for receiving lights in respective colors, and a means for combining and projecting image lights in respective colors obtained as a result of passing through each of said light valves.

24. A projection type video display, comprising the illuminating device according to claim 21, one light valve for receiving a light from said illuminating device, a means for supplying video signals for respective colors to said light valve in synchronous with an emitting timing of lights in the respective colors, and a projecting means for projecting an image light obtained by being passed through said light valve.

\* \* \* \* \*

UNITED STATES PATENT AND TRADEMARK OFFICE
CERTIFICATE OF CORRECTION

PATENT NO. : 7,237,909 B2  Page 1 of 1
APPLICATION NO. : 11/085275
DATED : July 3, 2007
INVENTOR(S) : Yoshihiro Yokote et al.

It is certified that error appears in the above-identified patent and that said Letters Patent is hereby corrected as shown below:

On the Title page,

Item "(73) Assignee", change "Sanyo Electronic Co., Ltd.", to --Sanyo Electric Co., Ltd.--.

Signed and Sealed this

Twenty-fifth Day of September, 2007

JON W. DUDAS
*Director of the United States Patent and Trademark Office*